L. H. SEUBERT.
ANTIFRICTION BEARING.
APPLICATION FILED JUNE 8, 1915.
1,218,605.
Patented Mar. 6, 1917.
2 SHEETS—SHEET 1.
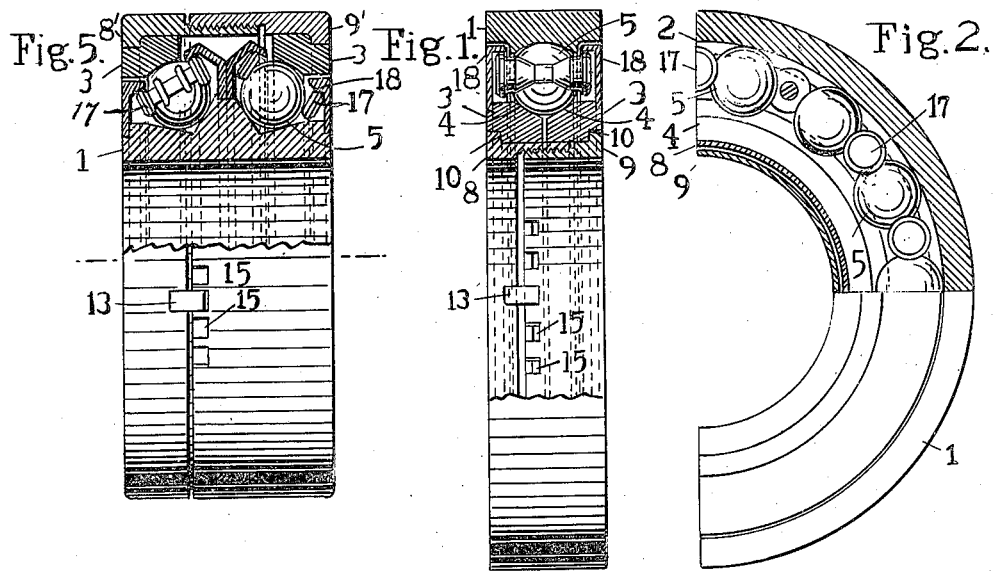
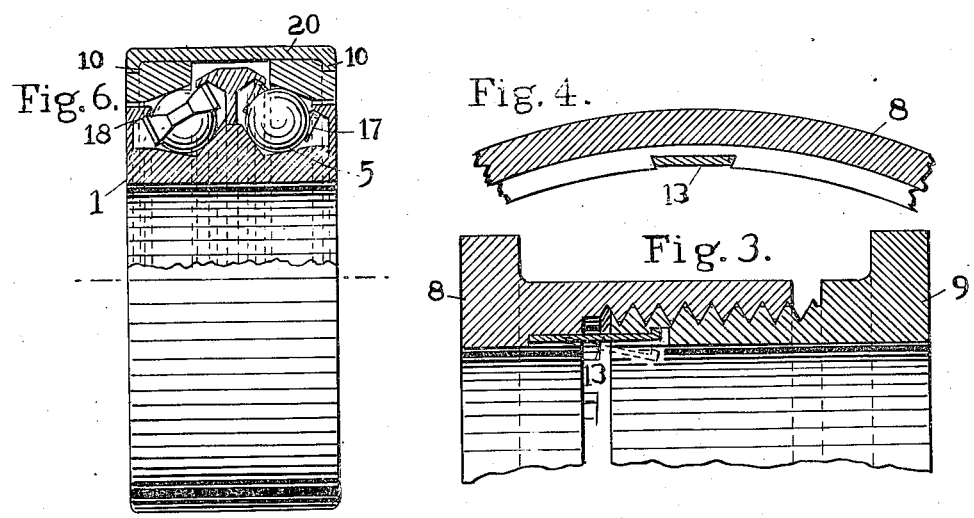
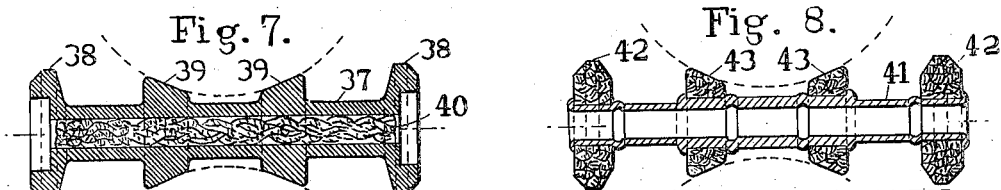
WITNESSES:
Arthur M. Cheney
Samuel W. Balch
INVENTOR,
Louis H. Seubert,
BY Dorsey & Cole
ATTORNEYS.

L. H. SEUBERT.
ANTIFRICTION BEARING.
APPLICATION FILED JUNE 8, 1915.
1,218,605.
Patented Mar. 6, 1917.
2 SHEETS—SHEET 2.
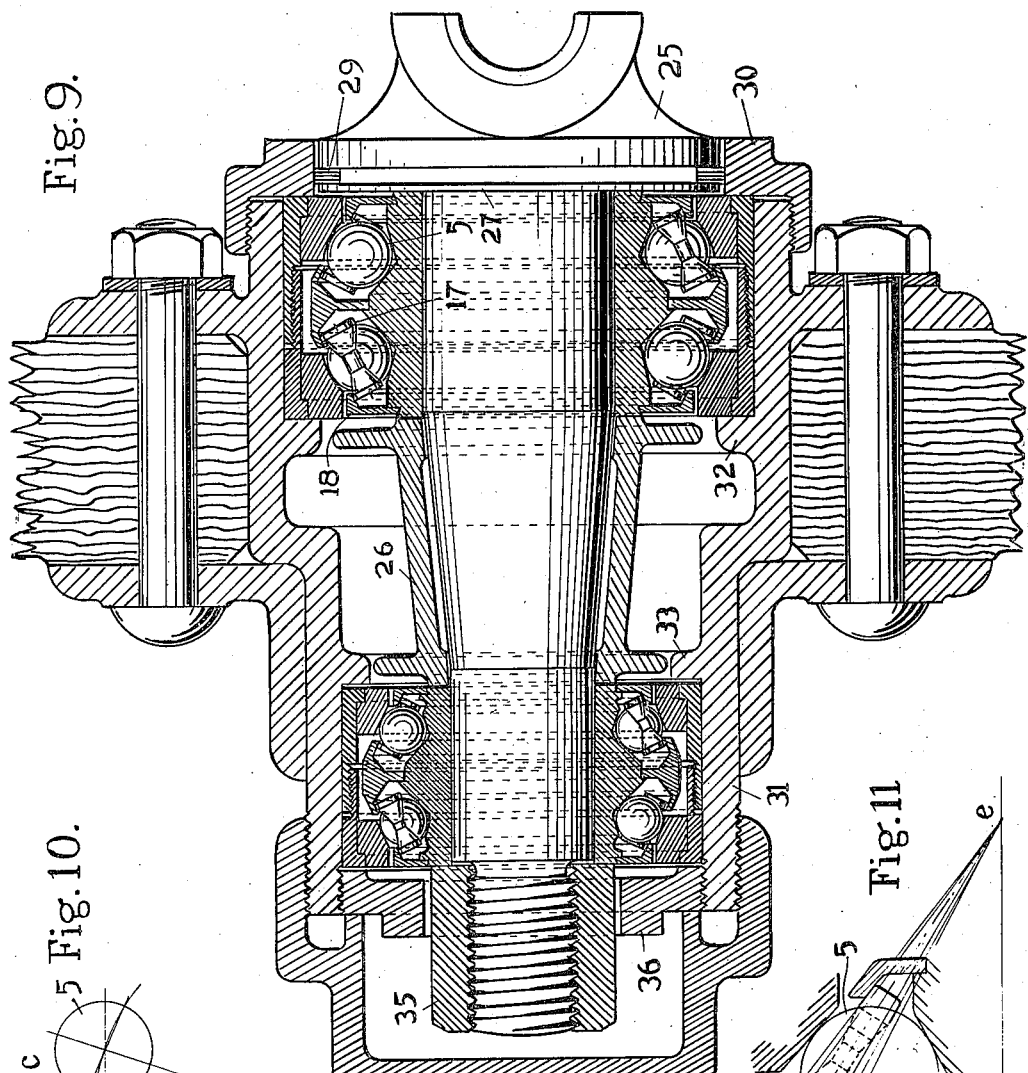
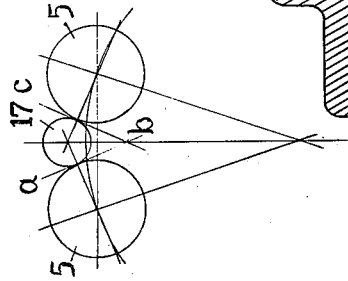
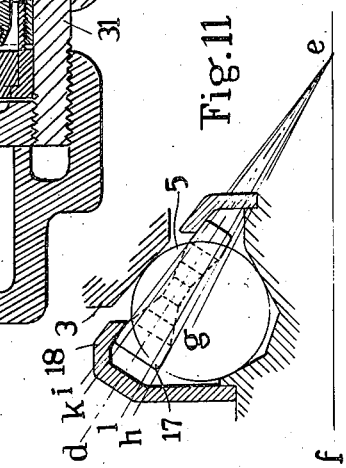
WITNESSES:
Arthur M. Cheney
Samuel W. Balch
INVENTOR.
Louis H. Seubert,
BY Dorsey & Cole
ATTORNEYS.

UNITED STATES PATENT OFFICE.

LOUIS H. SEUBERT, OF NEW YORK, N. Y.; CLARA H. SEUBERT, ADMINISTRATRIX OF SAID LOUIS H. SEUBERT, DECEASED, ASSIGNOR TO SEUBERT BEARING COMPANY, INC., A CORPORATION OF NEW YORK.

ANTIFRICTION-BEARING.

1,218,605.      Specification of Letters Patent.      Patented Mar. 6, 1917.

Application filed June 8, 1915. Serial No. 32,831.

*To all whom it may concern:*

Be it known that I, LOUIS H. SEUBERT, a citizen of the United States of America, and a resident of the borough of Manhattan, city, county and State of New York, have invented certain new and useful Improvements in Antifriction-Bearings, of which the following is a specification.

My invention relates to that class of bearings in which rolling members, ordinarily spherical but sometimes of a general cylindrical shape, are employed in connection with relatively movable runways and has reference, in part, to means by which the rolling members and runways may be assembled into a unit, and if desired, provided with means by which a proper adjustment can be made between the rolling members and the runways without destroying the unity of the bearing, means being also provided for locking the parts after the adjustment has been effected.

My invention relates further to anti-friction bearings in which, in addition to the bearing rollers and relatively movable runways, separating rollers are employed between the bearing rollers, which, coöperating with tracks for the separating rollers, prevent sliding friction between the bearing rollers themselves.

One of the objects of my invention is the production of an anti-friction bearing in which the parts can be properly assembled and formed into a unit which may be handled and used in the trade and incorporated as a whole into the mechanism for which it is intended, without the necessity of assembling or reassembling the parts thereof or without disturbing the proper adjustment, if previously made; such a bearing, as above stated, if desired, being provided with means by which the adjustment can be regulated and locked also independently of the permanent mounting.

A further object of my invention is the production of an anti-friction bearing the parts of which are so constructed, arranged and proportioned in relation to each other that only a rolling friction takes place between the contacting surfaces of the parts thereof.

A further object of the invention is the production of such a bearing so constructed that when subjected to ordinary or extraordinary wear or shock no wedging of the parts takes place, while at the same time the stress is so distributed as to practically assure against breakage.

As a part of this application I have illustrated certain examples of my invention and have shown its use in connection with an automobile wheel without, however, intending in any way to be limited either by the examples illustrated or use shown.

In these drawings—

Figure 1 is a view of one form of my invention, partly in vertical cross-section, and partly in side elevation, rolling members in the form of balls being illustrated;

Fig. 2 is a view of the embodiment of Fig. 1, being partly in longitudinal cross-section and partly in front elevation;

Fig. 3 is a view illustrating one embodiment of the means by which adjustment of the bearing is made and locked, the figure being mainly an enlarged cross-section of the clamping sleeve illustrated in Fig. 1 through the center thereof;

Fig. 4 is a detail showing a portion of the locking means of Fig. 3 in cross-section permanently secured in one member of the clamping sleeve;

Fig. 5 is a view of another embodiment of my invention partly in vertical cross-section, and partly in side elevation, also illustrating rolling members in the form of balls;

Fig. 6 is a view similar to Fig. 5 but illustrating another form;

Figs. 7 and 8 are longitudinal sections of different forms of separating rollers;

Fig. 9 is a vertical cross-section of the hub and axle of an automobile wheel illustrating one form of my invention applied thereto, two units being illustrated, and balls being employed;

Fig. 10 is a diagram illustrating the relation existing between the location of the separating rollers and the adjacent balls; and Fig. 11 is a diagram illustrating the location and shape of the separating rollers in a construction in which the plane of rotation of the balls is at an angle to the plane of rotation of the rotating runway.

Considering my invention so far as it deals with means for constructing a bearing into a unit and for adjusting the bearing and locking it in proper adjustment, the embodiment shown in Figs. 1, 2, 3 and 4 will first be described.

In this form the outer runway 1 is preferably integral in construction and is formed with a ball-race 2. The inner runway is composed of two annular members 3 3 formed with ball-races 4 4 inclined toward the plane of rotation of the balls 5 5 which are interposed between the outer and inner runways. The inner runway members are of such a size that when the bearing has been properly adjusted a slight space exists between them to permit of closer adjustment, or of takeup in case of wear.

The inner runway is mounted on an annular clamping sleeve formed by two members 8 and 9 suitably and finely threaded and screwed together in the manner illustrated. The sleeve members are further provided with means for engaging the inner runway members so that when the sleeve members are screwed together, the inner runway members are caused to approach one another, said means being illustrated by the annular flanges 10 10.

The locking means illustrated in the figures now under discussion comprise a resilient dog 13 securely fastened to one of the sleeve members which engages one of a series of apertures 15 15 formed at suitable intervals apart in the other sleeve member. These apertures are preferably of the same width as the dog and are of sufficient length to permit the range of adjustment necessary or desirable for the bearing. It may be desired that the clamping sleeve and locking means present a smooth cylindrical surface and I have accordingly illustrated the inner surface of the two sleeve members as being of the same diameter and have set the dog 13 into the sleeve member 8 so as to be practically flush therewith, and have cut away the surface of the sleeve member 9 in a direction from the apertures 15 15 toward the sleeve member 8 so that in locking position the dog is practically flush with the inner surface of this sleeve member also.

The anti-friction bearing illustrated in these figures embodies the separating rollers 17 17 interposed between the balls 5 5 and independent tracks 18 18 for the separating rollers mounted on the inner runway members 3 3. The rollers, as shown in these figures, have enlarged ends of equal diameter and a central reduced portion, the reduced portion being connected to the enlarged head on each side thereof by a conical portion, which conical portions contact with the adjacent balls to separate them. In the rotation of the rollers each conical portion thereof contacts with the adjacent ball on a circle, these circles of contact on the surface of the roller being of the same diameter, and the points of contact with the ball being on opposite sides of its equator (i. e. the great circle at right angles to the axis of rotation thereof). It is to be understood that these separating rollers and tracks are in no way essential to those features of my invention above described.

The assemblage of the above described elements as illustrated in the first four figures is as follows:

The outer runway and one member of the inner runway, for example, that supported by the sleeve member 8, together with the last mentioned member, are placed in their proper position, being preferably laid on a horizontal surface. The requisite number of balls, and in the case illustrated, separating rollers, are then placed in position in these runways. The other inner runway member is then placed in position and the sleeve member 9 screwed together to effect the proper tightness or adjustment of the bearing.

During the screwing together of the two sleeve members, the dog 13 is held out of engagement with the apertures 15 15, as illustrated by dotted lines in Fig. 3, until the proper adjustment has been made, when it is permitted to engage the then opposite aperture, the sleeve members being slightly turned to effect this if necessary. The parts are then locked in their proper position and the bearing ready for service. Should it be desired to change the adjustment of the bearing, the dog is moved out of engagement with the apertures until the desired adjustment has been made, when it is permitted to again resume its locking position: or should it be desired to take the bearing apart the dog is disengaged from the apertures and the clamping sleeve unscrewed.

In Fig. 5 is illustrated another embodiment of the elements of my invention above described. In this figure certain of the parts are reversed, the clamping sleeve composed of the members 8' and 9' being on the outside of the bearing unit instead of on the inside, and the dog 13 and locking apertures 15 15 consequently also being on the outside. Furthermore, the annular members 3 3 do not form raceways for the same set of balls, but the inner member 1 of the bearing has a runway on each side thereof, the races of each runway being so situated that the balls contained in the opposite runways rotate on axes inclined to the axis of rotation of the rotating runway, but it is obvious that this is not essential to this arrangement of the elements of my invention now under consideration. The use of the two sets of balls with their corresponding races, when the facings of the races of the two sets are reversed, as shown, permits the bearing to act properly when subjected both to radial and end thrusts coming upon it from either axial direction.

In Fig. 6 I have shown a similar arrangement of the bearing parts as illustrated in Fig. 5 but instead of using a two-piece clamping sleeve with the above described means for adjusting and locking, a one-piece sleeve is illustrated. It is contemplated in this construction that the proper adjustment of the bearing be permanently made when the bearing is assembled, or at least that further adjustment can be made only with considerable difficulty. This form of my invention is intended to be "fool-proof". The bearing parts are assembled in their proper relation and the sleeve 20 is then placed around them and pressed into the position shown, one or both of its flanges 10 10 being first left unturned to permit this to be done. In this embodiment it should be readily understood that the two sets of balls are not essential to the features of my invention now under consideration: furthermore, that the use of the one-piece sleeve is not limited to the outside of the bearing unit.

Regardless of the unitary assembling as above set forth, it is important that in the construction of either a bearing of the type shown in Figs. 1 and 2 or in Figs. 5 and 6, that the separating rollers 17 have such a relative position in respect to the balls 5 that under conditions occurring in practice they do not tend to crowd in between adjacent balls. This crowding may be prevented by making the angle subtended by the tangents to the separating rollers at the points at which they contact with the balls sufficiently great to cause the forces acting on the rollers to have a resultant tending to throw the rollers centrifugally of the bearing at least equal to the centripetal tendencies. In practice I have found that this angle, indicated at $a\ b\ c$ in Fig. 10 should not be less than thirty-two degrees. This numerical value is given by way of illustration and not limitation, and my invention contemplates any limiting angle which is in accordance with the principle above set forth.

Furthermore it is desirable in constructing a bearing such as is shown in Figs. 5 and 6, in which the balls do not rotate parallel with their plane of revolution and in which the axes of rotation of the balls are not parallel with the axis of rotation of the rotating runway that, (see Fig. 11) the axes $d\ e$ of the separating rollers 17 be so inclined to the axis $f\ e$ of rotation of the rotating runway as to intersect the latter axis at the same point in which the axes of rotation $g\ e$ of the balls intersect it. This construction is embodied in Figs. 5 and 6 of the accompanying drawings. With this construction the separating rollers do not have ends of equal diameter, but each has its ends of a different section of a cone, to provide the proper relative diameter of the separating roller ends to coöperate with the roller tracks 18. The cone $h\ e\ i$ of which the ends of the rollers are sections, is so shaped that it also has its apex at the point of intersection of the axis of rotation of the rotating runway by the axes of rotation of the balls, and of the separating rollers as before described.

The relative diameters of the conical portions connecting the ends and reduced central portions of each separating roller, at the line of contact with the adjacent balls, are also such that the circular line of contact between such conical portions and the balls are upon the surface of a cone $l\ e\ k$, which also has its apex at the point of intersection before referred to.

It is contemplated that where two runways with inclined faces are employed, one on each side of the bearing rollers, care should be taken in the construction of the bearing unit or in the mounting thereof to prevent undesired spreading of the two members. The spreading force (if any) of the members can be readily calculated from the inclination of the faces and the load for which the bearing is designed. Where a sleeve is used, such for example as that herein illustrated, sufficient strength can be allowed in the designing thereof to overcome this spreading force; or this can be otherwise provided for as will be seen from the subsequent discussion of Fig. 7.

It should further be noted that my invention is by no means confined to the employment of a sleeve for holding the bearing parts together independently of their permanent mounting. Other means will suggest themselves to those skilled in the art. It should be pointed out, however, that the tempering or hardness of the runways are elements to be considered should it be sought to join the runways directly.

It should also be pointed out that my invention contemplates slight deviation from the exact proportions above set forth. The proportions stated are the preferred proportions and result in a bearing in which, when properly constructed, there is no sliding friction between contacting parts, and consequently a bearing which needs no lubrication. But I am aware that slight variations can be made in these proportions and are likely to occur due to inaccuracy in the manufacture of the parts, which slight variations, though objectionable, may not affect the working of my bearing in practice to a material or noticeable degree; and my invention contemplates all of such slight variations.

In Fig. 9 I have illustrated the use of the bearing of the type shown in Fig. 5. This figure illustrates the forward axle 25 of an automobile, which is shown in plan, with two of my bearings mounted thereon and separated by a spreader 26. These axles have become more or less standardized and my bearings are adapted to be constructed of suitable dimensions to accord with these standards.

At the rear of axle 25 is an annular shoulder 27, against which one side of the inner member of the rear bearing unit abuts. This shoulder is provided with an annular groove for a packing ring 29, and is surrounded by a collar 30, which is inwardly threaded and in which is screwed a hub 31 having two internal annular flanges 32 and 33. One of the outer runways of the rear bearing and one side of its clamping sleeve abuts against the collar 30, and the flange 32 abuts against the other outer runway and the other side of the sleeve. The collar 30 and the hub 31 with its flanges 32 thereby not only serve as mountings for the rotating runways and the clamping sleeve of the rear bearing, but also reinforce the sleeve and prevent spreading of the runways.

One end of the spreader 26 abuts against the inner runways of the rear bearing and the other end against the inner runways of the forward bearing, the mounting of which latter is completed by a nut 35. A slight play may be allowed in the mounting of one of the runways of one of the bearings to take care of irregularities of construction.

The outer runways and coupling sleeve of the forward bearing are inclosed between the annular flange 33, above mentioned, and a nut 36 which screws into the hub, the flange 33 and the nut 36 reinforcing the mounting sleeve and preventing any spreading of the outer runways, as in the case of the rear bearing, if desired.

Thus in the case illustrated, which is more or less typical, it is seen that my bearings can be put in their permanent mounting as a whole without in any way interfering with their adjustment once properly made; and likewise they can be removed from their permanent mounting as a whole and without interference with this adjustment; elements which are obviously of great advantage.

In Fig. 7 is illustrated a modification of a separating roller adapted for use in connection with the above described anti-friction bearings. For convenience the figure illustrates this modification on lines suitable for use in radial bearings. This separating roller is designed for lightness and affords an opportunity of storing an oil or other material intended to prevent the bearing from rusting. The roller comprises a body 37 preferably hollow. On each end are raised circular contacting surfaces 38, 38 which run on the separating roller tracks above described, and toward the middle are raised other circular contacting surfaces 39 39 which run between the balls of the bearing. The size, shape and position of these contacting surfaces should be calculated as above described so that the bearing in which they are used runs without sliding friction. The separating roller, can, if desired, and if hollow, carry an absorbent material 40, saturated with oil for a general light diffusion in the bearing to prevent rust as above stated.

Fig. 8 shows a separating roller following the general construction of that shown and described in connection with Fig. 7. In this modification, however, the raised bearing surfaces are of a suitable material adapted not only to cut down the weight of the separating roller but also the noise of the bearing. Inasmuch as the separating rollers described in this application are not called upon to carry the pressures in the bearing but merely have a separating function in preventing contact between the rolling bearing elements proper (herein illustrated as balls), they may be made of any non-sonorous material consistent with the slight stress upon the separating rollers, which, while not necessarily possessing the hardness and crushing strength essential in the bearing elements, has the property of reducing noise in the bearing. As shown in the figure the body is in the form of a metal tube 41, upon which, at either end, are firmly mounted two disks or washers 42 42, of suitable material, such as indurated fiber, which run on the separating roller tracks above described, and toward the middle thereof are firmly mounted two other disks or washers 43 43 which run between the balls of the bearing. These disks or washers themselves may be saturated with a non-rusting element if the material chosen is not deleteriously affected thereby or the same can be supplied as stated in connection with Fig. 7 if desired. This modification is intended to be constructed along the lines above indicated to assure the absence of sliding friction.

The foregoing detailed description has been given for clearness of understanding and no undue limitation should be deduced therefrom, but the appended claims should be construed as broadly as permissible in view of the prior art.

Having thus described my invention what

I claim and desire to secure by Letters Patent is:

1. In an anti-friction bearing the combination of relatively movable runways, bearing rolling members between the runways, separating rolling members between the bearing rolling members, the axis of rotation of the separating rolling members being located to one side of a line joining the centers of the adjacent bearing rolling members, tracks for the separating rolling members located on the same side of the centers of the bearing rolling members as are the separating rolling members and connected with the runway on the opposite side of the said centers, and means by which the parts are maintained in a unitary construction independently of their permanent mounting, substantially as described.

2. In an anti-friction bearing the combination of relatively movable runways, one of said runways being formed in a plurality of parts, bearing rolling members between the runways, separating rolling members between the bearing rolling members, the axis of rotation of the separating rolling members being located to one side of a line joining the centers of the adjacent bearing rolling members, tracks for the separating rolling members located on the same side of the centers of the bearing rolling members as are the separating rollers and connected with the runway on the opposite side of the said centers, and means by which the parts are maintained in a unitary construction independently of their permanent mounting, substantially as described.

3. In an anti-friction bearing the combination of relatively movable runways, bearing rolling members between the runways, separating rolling members between the bearing rolling members, the axis of rotation of the separating rolling members being located to one side of a line joining the centers of the adjacent bearing rolling members, tracks for the separating rolling members located on the same side of the centers of the bearing rolling members as are the separating rolling members and connected with the runway on the opposite side of the said centers, and a sleeve by which the parts are maintained in a unitary construction independently of their permanent mounting, substantially as described.

4. In an anti-friction bearing the combination of relatively movable runways, one of said runways being formed in a plurality of parts, bearing rolling members between the runways, separating rolling members between the bearing rolling members, the axis of rotation of the separating rolling members being located to one side of a line joining the centers of the adjacent bearing rolling members, tracks for the separating rolling members located on the same side of the centers of the bearing rolling members as are the separating rolling members and connected with the runway on the opposite side of the said centers, a sleeve comprising a plurality of members by which the parts are maintained in a unitary construction independently of their permanent mounting and upon which is mounted the said multiple runway, means of variably connecting the sleeve members by which the parts of the said multiple runway may be moved toward one another, and means for locking the sleeve members together, substantially as described.

5. In an anti-friction bearing the combination of inner and outer runways, one of which is rotatable, bearing rolling members interposed between them, the runways being so arranged as to cause rotation of the interposed bearing rolling members upon axes inclined to the axis of rotation of the rotatable runway, separating rolling members arranged between the bearing rolling members, and tracks adapted to hold the separating rolling members in such position that the axes of the separating rolling members intersect the axis of the rotatable runway at the same point at which it is intersected by the axes of rotation of the bearing rolling members, substantially as described.

6. In an anti-friction bearing the combination of inner and outer runways, one of which is rotatable, bearing rolling members interposed between them, the runways being so arranged as to cause rotation of the interposed bearing rolling members upon axes inclined to the axis of rotation of the rotatable runway, and separating rolling members arranged between the bearing rolling members, each separating rolling member contacting with an adjacent bearing rolling member on opposite sides of the equator thereof, the circles of contact on each rolling member between it and an adjacent bearing rolling member being on the surface of a cone having its apex at the axis of the rotatable runway and on the axis of the separating rolling member, substantially as described.

7. In an anti-friction bearing the combination of inner and outer runways, one of which is rotatable, bearing rolling members interposed between them, the runways being so arranged as to cause rotation of the interposed bearing rolling members upon axes inclined to the axis of rotation of the rotatable runway, separating rolling members arranged between the bearing rolling members, and tracks adapted to hold the separating rolling members in such position that the axes of the separating rolling members intersect the axis of the rotatable runway at the same point at which it is intersected by the axes of rotation of the bearing rolling members, the faces on the ends of each rolling member contacting with the tracks being sections of a cone having its apex at said point of intersection, substantially as described.

8. In an anti-friction bearing the combination of inner and outer runways, one of which is rotatable, bearing rolling members interposed between them, the runways being so arranged as to cause rotation of the interposed bearing rolling members upon axes inclined to the axis of rotation of the rotatable runway, separating rolling members arranged between the bearing rolling members, and tracks adapted to hold the separating rolling members in such position that the axes of the separating rolling members intersect the axis of the rotatable runway at the same point at which it is intersected by the axes of rotation of the bearing rolling members, the ends of each separating rolling member contacting with the tracks being sections of a cone having its apex at said point of intersection and each separating rolling member contacting with an adjacent bearing rolling member on opposite sides of the equator thereof, the circles of contact on each separating rolling member between it and an adjacent bearing rolling member being on the surface of a cone having its apex at the said point of intersection, substantially as described.

9. In an anti-friction bearing the combination of inner and outer runways, one of which is rotatable, bearing rolling members interposed between them, the runways being so arranged as to cause rotation of the interposed bearing rolling members upon axes inclined to the axis of rotation of the rotatable runway, separating rolling members arranged between the bearing rolling members, and tracks adapted to hold the separating rolling members in such position that the axes of the separating rolling members intersect the axis of the rotatable runway at the same point at which it is intersected by the axes of rotation of the bearing rolling members, the faces on the ends of each separating rolling member contacting with the tracks being sections of a cone having its apex at said point of intersection and each separating rolling member contacting with an adjacent bearing rolling member on opposite sides of the equator thereof, the circles of contact on each separating rolling member between it and an adjacent bearing rolling member being on the surface of a cone having its apex at the said point of intersection, and means whereby the parts are maintained in a unitary construction independently of their permanent mounting, substantially as described.

10. In an anti-friction bearing the combination of relatively movable runways, bearing rolling members interposed between the runways and separating rolling members interposed between the bearing rolling members, the axes of rotation of the separating rolling members being located at such a distance outside of the lines joining the axes of rotation of adjacent bearing rolling members that the forces acting upon the separating rolling members have a greater tendency to move the separating rolling members centrifugally than centripetally, substantially as described.

11. In an anti-friction bearing, the combination of relatively movable runways, bearing rolling members interposed between the runways and separating rolling members interposed between the bearing rolling members, the axes of rotation of the separating rolling members being located at such a distance outside of the lines joining the axes of rotation of adjacent bearing rolling members that the forces acting upon the separating rolling members have a greater tendency to move the separating rolling members centrifugally than centripetally, and means whereby the parts are maintained in a unitary construction independently of their permanent mounting, substantially as described.

12. In an anti-friction bearing the combination of bearing rolling members, relatively movable runways therefor, separating rolling members, additional tracks therefor, the separating rolling members comprising elongated bodies each provided with a plurality of circular raised contacting flanges for rolling engagements with the said tracks, and a plurality of separating flanges for rolling engagement with the said bearing rolling members.

13. As a new and improved article of manufacture, a separating rolling member for anti-friction bearings comprising an elongated hollow body provided with a plurality of circular raised contacting surfaces, substantially as described.

14. As a new and improved article of manufacture, a separating rolling member for anti-friction bearings, comprising an elongated body provided with non-sonorous circular contacting surfaces, substantially as described.

15. As a new and improved article of manufacture, a separating rolling member for anti-friction bearings, comprising an elongated hollow body provided with a plurality of circular raised non-sonorous contacting surfaces, substantially as described.

16. As a new and improved article of manufacture, a separating rolling member for anti-friction bearings, having non-sonorous contacting portions, substantially as described.

17. In an anti-friction bearing, the combination of movable runways, rolling elements of suitable material interposed between the runways, and separating rolling members interposed between the bearing rolling members, the separating rolling member being of non-sonorous material and softer than the bearing rolling members, substantially as described.

Signed at New York, N. Y., this 3rd day of June, 1915.

LOUIS H. SEUBERT.